United States Patent [19]

Cates

[11] 4,404,108
[45] Sep. 13, 1983

[54] ADDITIVE FOR DRILLING FLUIDS

[76] Inventor: Allen E. Cates, 501 Harwell Dr., Lafayette, La. 70503

[21] Appl. No.: 300,299

[22] Filed: Sep. 8, 1981

[51] Int. Cl.$^3$ ................................................ C09K 7/02
[52] U.S. Cl. .............................. 252/8.5 A; 252/8.5 C
[58] Field of Search ............ 252/8.5 A, 8.5 C, 8.5 LC

[56] References Cited

U.S. PATENT DOCUMENTS

| | | | |
|---|---|---|---|
| 3,028,333 | 4/1962 | Stratton et al. | 252/8.5 |
| 3,089,842 | 5/1963 | Stratton | 252/8.5 |
| 3,135,727 | 6/1964 | Monroe | 252/8.5 X |
| 3,479,287 | 11/1969 | Floyd et al. | 252/8.5 |

FOREIGN PATENT DOCUMENTS 722720  11/1965  Canada .................................. 252/8.5

*Primary Examiner*—Herbert B. Guynn
*Attorney, Agent, or Firm*—Cushman, Darby & Cushman

[57] ABSTRACT

A water-based gas or oil well drilling fluid comprising an aqueous clay dispersion containing as a thinner and water loss control agent, the essentially water-soluble product obtained by heating together quebracho, lignite, gilsonite and sulfonating, methylating and causticizing agents.

4 Claims, No Drawings

ADDITIVE FOR DRILLING FLUIDS

BACKGROUND AND SUMMARY OF THE INVENTION

The present invention is concerned with a novel composition which is useful as an additive for oil and gas well drilling fluids, notably, aqueous clay dispersions, or muds, for the purpose of improving fluid rheology and fluid loss control.

The use of drilling fluid such as clay-based dispersions or muds, to coat the walls of well holes, is an old and well-established procedure. The purpose of the fluid is to stabilize the walls of the hole by forming a relatively thin but strongly adherent coating or "cake" on the walls. The coating must be able to withstand relatively high temperatures and it should be resistant to the passage of moisture or fluid therethrough; otherwise the desired wall stability is not maintained. More particularly, if liquid gets past the coating and into the shale formation, the formation will "sluff", buckle or swell, and thus cause substantial well hole problems.

A wide variety of drilling fluids, usually clay-based muds or dispersions, have been extensively employed. These fluids have included various types of additives such as chrome lignosulfonates, lignins, tannins, oxidizing agents, etc. These additives may have a variety of functions or purposes, e.g. to serve as thinners or to improve fluid loss control. One such available additive is known as "Temflo-C". This product, which is used as a thinner, is a sulphomethylated reaction product comprising lignin, quebracho, sodium sulfite, paraformaldehyde and sodium hydroxide. The composition also includes sodium dichromate as oxidizing agent.

The principal object of the present invention is to provide an additive for gas and oil well drilling fluids, notably aqueous clay-based dispersions, which effectively functions to improve the fluid rheology and fluid loss control. A more specific object is to provide such an additive which can be used as a thinner for conventional drilling fluids and to improve the wall cake or coating obtained therewith so as to reduce fluid loss and to provide improved wall stabilization. Other objects will also be hereinafter apparent.

The invention is based on the finding that gilsonite may be advantageously reacted with lignite and a tannin, particularly quebracho, together with sodium sulfite, paraformaldehyde and sodium hydroxide, in water, to give a reaction product which is eminently suitable for use as a drilling fluid additive to improve rheology and fluid loss control.

The additive of the invention may be used with conventional gas or oil well drilling fluids. These are usually clay-based aqueous dispersions or muds. The present product may be used as the primary or sole additive in a manner similar to chrome lignosulfonate (CLS) additives or it may be used in combination with such other additives. Since the present additive does not contain any heavy metals, it has the advantage of being suitable for use in environmental areas where heavy metals cannot be used, to provide the desired rheological properties and fluid loss control. On the other hand, the product also demonstrates its indicated advantages when used with heavy metal-based additives. Thus, the present additive can be effectively used with CLS to provide a system with appreciably improved rheological properties and fluid loss control. It is also contemplated, as exemplified herein, that the additive will be used with conventional oxidizing agents, e.g. sodium dichromate, to obtain optimum results. Advantageously the present additive is dry blended with oxidizing agent to give a product which demonstrates highly advantageous rheological properties that are retained and even enhanced at extremely high thermal conditions. Preferably such a dry blend is pre-packaged to insure proper ratios of additive to oxidizing agent although, if desired, such mixture or other type of mixture can be prepared at the wall site. Modification of the additive to include an oxidizing agent such as sodium dichromate gives a more stable product, especially for use at particularly elevated temperatures. Without the oxidizing agent ten minute gel strengths (a standard test) may be excessive and the tolerance of the additive for elevated temperature and low gravity solids when used by itself may not be completely satisfactory in certain situations.

The use of sodium sulfite, paraformaldehyde and sodium hydroxide to sulphomethylate and causticize mixtures of lignins and tannins is known (see, for example, the Temflo-C product referred to earlier). The invention, however, also requires the presence of gilsonite in the reaction product, as noted. It appears that the reaction solubilizes the gilsonite component because the reaction product is essentially watersoluble.

The gilsonite component appears to be particularly important to control fluid loss and to act as a shale inhibitor. This component by itself would tend to cause an increase in fluid viscosity but this is effectively dealt with by the other components which make up the additive of the invention.

As indicated earlier, the additive of the invention comprises the product obtained by reacting together in the presence of water, quebracho, lignite, gilsonite, sodium sulfite, paraformaldehyde and sodium hydroxide. Each of the indicated components is essential to obtain optimum results according to the invention.

The reaction conditions used to make the product of the invention can be fairly widely varied. Usually, however, the product is prepared by heating the indicated components in a sealed reaction vessel at a temperature in the order of 100° to 150° C. for a period of 120 to 30 minutes, it being appreciated that shorter times can be used as the temperature is increased. It appears that the reaction results in sulphomethylation and caustization of a complex formed between the quebracho, lignite and gilsonite although the chemistry involved is highly complex and not fully understood. In any case, the resulting composition, which is essentially water-soluble, is preferably dried and may be stored for subsequent blending with conventional clay-based aqueous drilling dispersions or drilling fluids. This blending advantageously is carried out on site although it will be appreciated that the additive may be pre-packed with the drilling fluid.

The proportions of the reactants used to make up the additive of the invention may be relatively widely varied. Preferably, however, the reactant proportions fall within the following ranges on a solids basis:

|  | % Solids |
| --- | --- |
| Quebracho | 15–45% |
| Lignite | 25–45% |
| Gilsonite | 10–15% |
| Sodium Sulfite | 10–25% |
| Paraformaldehyde | 1–10% |

| | % Solids |
|---|---|
| Sodium hydroxide | 2–10% |

While proportions outside these ranges may be used, it is noted that the gilsonite should not exceed 20% by weight, on a solids basis. The sodium hydroxide should also be used in amount sufficient to solubilize the gilsonite.

Advantageously the additive is prepared by mixing together the indicated reactants with water in a ratio of 40% solids, 60% liquid (water). However, it will be appreciated that this ratio can be widely varied without substantially effecting the desired results. The optimum ratios for any particular situation will depend on a variety of other factors, e.g. the water content of the reactants, water hardness, the sort of mixers which are available, drying time, the economics involved, etc. Usually, however, the ratio of water to reactants (solids basis) will fall in the range of 40–80% liquid and 80–40% reactants although, as noted, the ratio is not critical and will be selected in any particular situation to fit in with other operating conditions.

The reactants employed to make the additive are all commercially available and may be used in this form. The quebracho used in the examples which follow was the pure extract in block form which was pulverized into a powder before mixing with other reactants. It is also possible to use spray dried clarified pure quebracho extract. Alternatives to quebracho include wattle, diviclivi or chestnut. The tannin content is the determining factor for the tannin material and amount thereof utilized. Preferably a minimum of 72% by weight of tannin is available in the material used.

The lignite used in the examples herein was a crushed commercial grade of mixed processed lignite. It is preferred that the lignite used be at least 75–85% soluble in a caustic (NaOH) solution.

Typically the gilsonite is that available as "American Gilsonite". This is a pulverized GP grade gilsonite with a flash point of 600° F./316° C. and a softening point of 320° F./160° C. This gilsonite was used in the ensuing examples although it will be appreciated that any available gilsonite may be used for present purposes.

The invention is illustrated by the following example wherein parts and percentages are by weight unless otherwise stated:

EXAMPLES

A product according to the invention, and identified as composition "AE-1" for ease of reference, was prepared from the following components in the amounts indicated, "gr" and "ml" representing grams and milliliters, respectively:

| AE-1 | | | |
|---|---|---|---|
| Water | 600 ml | | |
| Quebracho | 108 gr | 27% | Total Solids |
| Lignite | 148 gr | 37% | Total Solids |
| Gilsonite | 40 gr | 10% | Total Solids |
| Sodium Sulfite | 70 gr | 17.5% | Total Solids |
| Paraformaldehyde | 10 gr | 2.5% | Total Solids |
| Sodium Hydroxide | 24 gr | 6% | Total Solids |
| Total solids wt | 400 gr | 40% | |
| Total liquids wt | 600 gr | 60% | |
| Total wt | 1000 gr | 100% | |

The moisture content in the materials used was not considered in determining weights and ratios of materials.

The composition was prepared by blending together the quebracho, lignite and gilsonite (i.e., the organics) in a mixture or slurry tank. The rest of the composition components (conveniently called the "chemicals") was separately blended. A portion of the water (about 100 ml) was used for blending the chemicals, i.e., the sulfite, paraformaldehyde and sodium hydroxide, the rest of the water (500 ml) being used to mix together the organics, i.e., the quebracho, lignite and gilsonite.

The two blends of chemicals and organics were then mixed together in a reaction vessel which was subsequently sealed and heated to a reaction temperature of 125° C. The temperature was maintained for two hours after which the reaction mixture was cooled and the reaction vessel opened to release the pressure. The resulting mixture was a thin fluid with no evidence of polymerization or molecular structure building. This mixture was then oven dried and pulverized to give a product according to the invention identified as AE-1.

The following compositions were prepared in similar manner using the weights, ratios and reaction conditions indicated:

| AE-2 | | | |
|---|---|---|---|
| Water | 350 ml | | |
| Quebracho | 82 gr | 35% | Total Solids |
| Gilsonite | 93 gr | 40% | Total Solids |
| Sodium Sulfite | 41 gr | 17.5% | Total Solids |
| Paraformaldehyde | 6 gr | 2.5% | Total Solids |
| Sodium Hydroxide | 12 gr | 5% | Total Solids |
| Total solids wt | 234 gr | 40% | |
| Total liquids wt | 350 gr | 60% | |
| Total wt | 584 gr | 100% | |

Reaction Time and Temperature: 120 min/125° C.

| AE-3 | | | |
|---|---|---|---|
| Water | 350 ml | | |
| Quebracho | 64 gr | 27.5% | Total Solids |
| Lignite | 64 gr | 27.5% | Total Solids |
| Gilsonite | 47 gr | 20.0% | Total Solids |
| Sodium Sulfite | 41 gr | 17.5% | Total Solids |
| Paraformaldehyde | 6 gr | 2.5% | Total Solids |
| Sodium Hydroxide | 12 gr | 5.0% | Total Solids |
| Total Solids | 284 gr | 40% | |
| Total Liquid | 350 gr | 60% | |
| Total wt | 584 gr | 100% | |

Reaction Time and Temperature: 120 min/125° C.

| AE-4 | | | |
|---|---|---|---|
| Water | 350 ml | | |
| Quebracho | 94 gr | 40% | Total Solids |
| Lignite | 47 gr | 20% | Total Solids |
| Gilsonite | 35 gr | 15% | Total Solids |
| Sodium Sulfite | 41 gr | 17.5% | Total Solids |
| Paraformaldehyde | 6 gr | 2.5% | Total Solids |
| Sodium Hydroxide | 12 gr | 5% | Total Solids |
| Total Solids | 235 gr | 40% | |
| Total Liquid | 350 gr | 60% | |
| Total wt | 585 gr | 100% | |

Reaction Time and Temperature: 60 min/150° C.

| AE-5 | |
|---|---|
| Water | 350 ml |

AE-5

| | | | |
|---|---|---|---|
| Quebracho | 63 gr | 27% | Total Solids |
| Lignite | 77 gr | 33% | Total Solids |
| Gilsonite | 35 gr | 15% | Total Solids |
| Sodium Sulfite | 41 gr | 17.5% | Total Solids |
| Paraformaldehyde | 6 gr | 2.5% | Total Solids |
| Sodium Hydroxide | 12 gr | 5% | Total Solids |
| Total Solids | 234 gr | 40% | |
| Total Liquid | 350 gr | 60% | |
| Total wt | 584 gr | 100% | |

Reaction Time and Temperature: 60 min/150° C.

AE-6

| | | | |
|---|---|---|---|
| Water | | | |
| Quebracho | 74 gr | 31.5% | Total Solids |
| Lignite | 74 gr | 31.5% | Total Solids |
| Gilsonite | 28 gr | 12.0% | Total Solids |
| Sodium Sulfite | 41 gr | 17.5% | Total Solids |
| Paraformaldehyde | 6 gr | 2.5% | Total Solids |
| Sodium Hydroxide | 12 gr | 5.0% | Total Solids |
| Total Solids | 234 gr | 40% | |
| Total Liquid | 350 gr | 60% | |
| Total wt | 584 gr | 100% | |

Reaction Time and Temperature: 90 min/135° C.

The composition identified as AE-2 was discarded as unsuitable because of its viscosity and thickness indicating undesired polymerization or severe molecular structures forming in the reaction vessel. This was apparently due to the absence of lignite, or its equivalent, as required by the present invention.

The other compositions, AE-1, AE-3, AE-4 and AE-5, were tested to determine performance characteristics in terms of rheology and fluid loss control. The produce AE-6 was prepared on the basis of these test results as offering an optimum combination of performance properties and economics.

It is to be noted that, in preparing the foregoing compositions, reaction temperatures and times were varied over a range of 125°–150° C. for reaction times of 120–30 minutes. The results indicate that reaction temperature and time can be varied without substantially changing the properties of the resulting product.

The following tests were carried out with compositions AE-1, AE-3, AE-4 and AE-5 with the indicated results:

TESTS

A base mud was prepared with 20 lb per barrel equivalent of bentonite and water. The product of AE-1 was added along with calcium hydroxide and sodium hydroxide. Rheologies were taken initially and after aging. Aging was accomplished in brass Baroid aging cells. The cells were statically aged in a laboratory oven where a constant temperature could be maintained. Aging was carried out for at least (16) sixteen hours or longer. After aging the cells were cooled to room temperature (20°–25° C.). The mud was removed from the cells and stirred. Rheologies were obtained from a FANN Rheometer. Fluid loss values were obtained from a FANN API filter press. The mud samples were placed in the filter press at 100 psi for 30 minutes. The filtrate was collected and measured.

Tests were also included using a 14 lb per gallon mud prepared with the above-described base mud and weighed up with barium sulfate.

Additionally, tests were conducted using a 16 lb per gallon fluid. This fluid was prepared with water, 22 lb per barrel equivalent bentonite, 25 lb per barrel equivalent Martin #5 ball clay, and barium sulfate as necessary to obtain the appropriate mud weight. Test series were numerically code with brief descriptions of the base fluids. Cell samples within each series were alphabetically coded with brief descriptions of the additives. After each series interpretations and conclusions were provided.

Test No. 1

In this test the base mud consisted of water and Wyoming bentonite. The pH of this mud was 8.6 and its weight was 8.5 lbs per gallon.

Four aging cells were used in the test.

The contents of the aging cells were as follows:

Cell (A)

Base mud only.

Cell (B)

Base mud with 3 lbs/bbl AE-1; ½ lb/bbl calcium hydroxide.

Cell (C)

Base mud with 3 lbs/bbl AE-1; ½ lb/bbl sodium hydroxide.

Cell (D)

Base mud with 3 lbs/bbl Temflo-C; ½ lb/bbl sodium hydroxide.

Characteristics of the cell contents were as follows:

| | Cell (A) | Cell (B) | Cell (C) | Cell (D) |
|---|---|---|---|---|
| Before Aging: | | | | |
| Plastic Viscosity | 14 | 15 | 13 | 14 |
| Yield Point | 17 | 4 | 7 | 9 |
| Gel Strength | 3/20 | 0/1 | 0/6 | 1/10 |
| After Aging at 95° C.: | | | | |
| Plastic Viscosity | 12 | 12 | 16 | 18 |
| Yield Point | 17 | 9 | 14 | 8 |
| Gel Strength | 8/30 | 2/23 | 1/10 | ½ |
| Fluid Loss | 12 ml | 8.7 | 10 | 8 |

It is noted that a significant improvement was obtained particularly in terms of reduced fluid loss, when AE-1 was added to the base mud. The addition of calcium hydroxide (Cell (B)) gave the over-all best results in terms of yield point. After aging the gel strengths were better with sodium hydroxide.

Test No. 2

In this test, the base mud consisted of water, Wyoming bentonite and barium sulfate. The mud weight was 14 lbs per gallon. The base mud properties were as follows:

Plastic viscosity—37
Yield Point—50
Gel Strength—37/68
Fluid Loss—Blown dry

Two aging cells were used in this test, the contents being as follows:

Cell (A)

Base mud with 6 lbs/bbl AE-1, 1 lb/bbl sodium hydroxide, ½ lb/bbl calcium hydroxide.

Cell (B)

Base mud with 6 lbs/bbl AE-1, 1 lb/bbl sodium hydroxide, 0.6 lbs/bbl sodium dichromate.

Both samples were aged at 150° C. for 18 hours. Initial properties were not taken. However, after aging, the following properties were noted:

|  | Cell (A) | Cell (B) |
|---|---|---|
| Plastic Viscosity | 58 | 55 |
| Yield Point | 19 | 28 |
| Gel Strength | 4/40 | 3/6 |
| Fluid Loss | 8 ml | 5.4 ml |

It will be appreciated that 150° C. is a relatively high temperature for any drilling mud. Hence this is a severe test of the compositions. Despite this the results were favorable. The effects of the sodium dichromate addition were particularly impressive. Surprisingly AE-1 with no heavy metals had a marked improvement over the base mud. The 10 min. gel strengths were a little higher than optimum and it appears that in the case of Cell (A) at least the calcium and sodium hydroxide might be counteracting with each other.

Test No. 3

The base mud for this test was prepared with 22 lb per barrel equivalent Wyoming bentonite, 25 lbs per barrel Martin #5 ball clay and approximately 584 grams of barium sulfate, as necessary to obtain a mud weight of 16 lbs per gallon. The initial properties of this mud were:

Plastic Viscosity—24
Yield Point—62
Gel Strength—
Fluid Loss—66 ml

The contents of the cells were as follows:

Cell (A)

Base mud with 6 lbs/bbl AE-1, 1½ lbs/bbl sodium hydroxide, 0.6 lb/bbl sodium dichromate.

Cell (B)

Base mud with 6 lbs/bbl AE-1, 1½ lbs/bbl sodium hydroxide, ½ lb/bbl calcium hydroxide.

Cell (C)

Base mud with 6 lbs/bbl AE-1, 2 lbs/bbl sodium hydroxide, ½ lb/bbl calcium hydroxide.

Cell (D)

Base mud with 6 lbs/bbl Temflo-C, 1½ lbs/bbl sodium hydroxide.

Initial properties were as follows before aging:

|  | Cell (A) | Cell (B) | Cell (C) | Cell (D) |
|---|---|---|---|---|
| Plastic Viscosity | 25 | 53 | 34 | 22 |
| Yield Point | 7 | 11 | 4 | 10 |
| Gel Strength | 1/12 | 3/70 | 1/25 | ½ |
| Fluid Loss | 7.2 ml | 7.4 | 3 | 5.5 |

All cells were aged for 16½ hours at 150° C. After aging they were cooled to room temperature and the properties noted as follows:

|  | Cell (A) | Cell (B) | Cell (C) | Cell (D) |
|---|---|---|---|---|
| Plastic Viscosity | 34 | 33 | 31 | 26 |
| Yield Point | 2 | 2 | 11 | 0 |
| Gel Strength | ½ | 1/16 | 4/54 | ½ |
| Fluid Loss | 7.6 | 7.6 | 12 | 7.6 |

The purpose of this test was to compare the effectiveness of AE-1 with Temflo-C which, as noted above, is a commercially available high temperature thinner and fluid loss control agent.

The results of the test showed the initial properties of AE-1 to be somewhat higher on 10 minute gel strength but overall the products werer comparable. The magnitude of change between the base mud and the composition containing AE-1 was very significant. The addition of caustic soda, or lime, or combination to the base mud without a thinner results in total flocculation somewhat in appearance to cement.

During this test, while preparing Cell (C), before adding the calcium hydroxide, the rheologies were checked. They were a plastic viscosity of 18, a yield point of 8, and gel strength of ¼. The addition of lime improved the yield point initially but caused increased gel strengths. Before aging Cell (C) had much better properties but, after aging, Cell (B) was considerably better. It appears that this may be a function of the difference in pH or again, as in Test No. 2 there may be some counteraction between the lime and caustic soda. Regardless, the indicated effects of AE-1 on a drilling fluid are clearly beneficial.

Test No. 4

In this test, the same base mud was used as in Test No. 3.

Cell (A)

Base mud with 4 lbs/bbl CLS, 1½ lb/bbl sodium hydroxide.

Cell (B)

Base mud with 4 lbs/bbl CLS, 1½ lb/bbl sodium hydroxide, 2 lbs/bbl AE-1.

Cell (C)

Base mud with 4 lbs/bbl CLS, 1½ lb/bbl sodium hydroxide, 2 lb/bbl "Soltex".

Cell (D)

Base mud with 6 lb/bbl AE-1, ½ lb/bbl calcium hydroxide.

|  | Cell (A) | Cell (B) | Cell (C) | Cell (D) |
|---|---|---|---|---|
| Initial: |  |  |  |  |
| Plastic viscosity | 18 | 22 | 19 | 25 |
| Yield Point | 0 | 0 | 0 | 2 |
| Gel Strength | 1/1 | 0/2 | 0/1 | 2/52 |
| After aging for 18 hours at 150° C.: |  |  |  |  |
| Plastic viscosity | 24 | 28 | 34 | 24 |
| Yield Point | 0 | 0 | 0 | 2 |
| Gel Strengths | 2/19 | ½ | 1/11 | 0/10 |
| Fluid Loss | 23 ml | 13 ml | 17 ml | 13 ml |
| pH | 6.9 | 7.0 | 7.4 | 6.8 |

The addition of the AE-1 clearly improved the rheologies and fluid loss over CLS (chrome lignosulfonite) alone or when another popular shale inhibitor ("Soltex") was added.

It is noteworthy to see that in Cell (D) with AE-1 and lime alone, while the initial gels were high they are quite acceptable after aging. The low gel strengths and yield point after aging at 150° C. over night were impressive, particularly in the absence of heavy metal.

Test No. 5

The base mud used in this test was the same as Test No. 3 and Test No. 4.

Cell (A)

Base mud with 6 lbs/bbl AE-1, 2 lbs/bbl sodium hydroxide.

Cell (B)

Base mud with 6 lbs/bbl AE-1, 1 lb/bbl calcium hydroxide.

Cell (C)

Base mud with 6 lbs/bbl AE-1, 1½ lbs/bbl sodium hydroxide, 0.6 lbs/bbl sodium dichromate.

Cell (D)

Base mud with 6 lb/bbl CLS, 1½ lbs/bbl sodium hydroxide.

|  | Cell (A) | Cell (B) | Cell (C) | Cell (D) |
|---|---|---|---|---|
| Initial: |  |  |  |  |
| Plastic viscosity | 27 | 24 | 44 | 26 |
| Yield Point | 0 | 2 | 17 | 0 |
| Gel Strength | ½ | 2/85 | 3/18 | ½ |
| pH | 12.2 | 10.3 | 11.3 | 11.0 |
| After aging for 18 hours at 200° C.: |  |  |  |  |
| Plastic viscosity | 43 | 26 | 76 | 38 |
| Yield Point | 113 | 36 | 47 | 81 |
| Gel Strength | 94/124 | 20/82 | 28/105 | 65/90 |
| Fluid Loss | Could Not Determine | 14 ml | 9.0 ml | 14 ml |
| pH | 8.4 | 8.0 | 8.4 | 7.5 |

It is noted initially that this is a very difficult test for any drilling mud. The initial test results for Cell (C) were higher than normal. This may have been due to some dehydration.

The test is included herein to show that at the conditions indicated there was a breakdown in the chrome lignosulfonated mud. The Cell (B) sample did very well considering the absence of oxidizer. The presence of an electrolyte is apparently the factor. Cell (C) indicated evidence of cell leakage. Otherwise the properties of this sample would have been improved. In any event it is evident that AE-1 has higher tempreature tolerance than a chrome lignosulfonate and therefore is an improvement thereover.

Test No. 6

This test was conducted with AE-1, "Soltex", and "Banstuff". All of these are asphalt or gilsonite based products. Each of these products was introduced to 40 ml of water and allowed to remain for 36 hours. The purpose of the test was to determine which material was the most soluble and to see if they would come out of solution. AE-1 was immediately soluble. Some portions of both Banstuff and Soltex either floated on top or settled on the bottom.

After two days, 2 ml of commercial diesel oil were introduced into each sample. There was no appreciable affect on AE-1. Some degree of increased solubility occurred in the case of Soltex. There was little or no effect on Banstuff.

Another test was conducted by introducing each product into 40 ml of diesel oil. All three materials were more soluble, but separation occurred in the case of Banstuff and Soltex. The AE-1 was immediately dissolved. After 24 hours 20 ml of water were introduced into each sample. There was no effect on the AE-1 sample. Both Soltex and Banstuff indicated separation. At the end of the test the material was poured out. Both Soltex and Banstuff had particle residue. There was some residue at the bottom of the container with AE-1 but no particles.

The foregoing is strong evidence that as a shale inhibitor AE-1 would be more effective than Soltex and Banstuff because it is more soluble.

There is less asphalt product in AE-1 compared to Soltex or Banstuff. Nevertheless, there is a sufficient amount of gilsonite present to adequately coat the well bore and prevent sluffing of scale.

It also appeared that AE-1 has improved fluid loss characteristics therefore allowing a thinner, more impermeable wall cake thus preventing the sluffing of shale formations.

The previous test results indicate that each of the compositions AE-1 and AE-3 to AE-6 would be satisfactory as an additive to an aqueous clay dispersion well drilling fluid for use as a thinner and water loss control agent. Each of these compositions provides improved rheology and fluid loss control. The best fluid loss control appeared to be demonstrated by AE-4 while AE-5 seemed to offer the best rheology. It is evident from the results that compositions according to the invention can be tailored by variations in the compositions and the specific manner in which they are used, e.g. by the addition of an oxidizing agent such as sodium dichromate, to give optimum results for any particular situation.

The following composition is a further illustration of an additive according to the invention, the additive being made in the same way as AE-1:

| Dry Solids Basis | |
|---|---|
| Quebracho | 32% |
| Lignite | 37% |
| Gilsonite | 4% |
| Sodium Sulfite | 18.5% |
| Paraformaldehyde | 2.5% |
| Sodium Hydroxide | 6% |

It will be appreciated from the foregoing that the additive of the invention represents a useful alternative to prior modifiers for aqueous clay dispersions or well drilling fluids which allows the fluid to remain thin while aiding in improving the wall cake with the result that the well wall is effectively coated and there is a substantially reduced tendency for shale formation to "sluff". These advantages are realized without substantially increasing the viscosity of the drilling fluid and the ease of its application and use. Other advantages of the present additive in terms of the improved rheology and fluid loss control which it offers will be evident to those in the art. However, in summary, it is noted that advantages of the present additive include the ability to reduce the migration of water to the shale formation, to refrain from increasing the viscosity of the drilling fluid, to improve overall fluid rheology, and to provide shale inhibition. The additive has the required ability to bond to the edges of clay particles in a clay dispersion and to satisfy the electrical charges, and thus disperse the particle. The bonding, coating and dispersing of the clay particles are such that the fluid to which the present product is added, provides a thin impermeable wall cake that effectively decreases water loss and prevents the hydration of permeable shale formations. The additive permits this to be done in a way which is ecologically acceptable throughout the oil and gas well drilling industry.

I claim:

1. A water-based gas or oil well drilling fluid comprising an aqueous clay dispersion containing, as a thinner and water loss control agent, the essentially water-soluble product obtained by heating together at 100°–150° C. for a period of 120–30 minutes quebracho, lignite, gilsonite and sodium sulfite, paraformaldehyde and sodium hydroxide as sulfonating, methylating and causticizing agents, respectively, the percent by weight proportions of said components being as follows:

|  | % Solids |
| --- | --- |
| Quebracho | 15–45% |
| Lignite | 25–45% |
| Gilsonite | 4–15% |
| Sodium Sulfite | 10–25% |
| Paraformaldehyde | 1–10% |
| Sodium hydroxide | 2–10%. |

2. A gas or oil well drilling fluid according to claim 1 including an oxidizing agent which is sodium dichromate in an amount sufficient to control the gel strength of said drilling fluid.

3. The product obtained by heating together in water at 100°–150° C. for a period of 120–30 minutes, a mixture of quebracho, lignite, gilsonite, sodium sulfite, paraformaldehyde and sodium hydroxide in the following proportions by weight:

|  | % Solids |
| --- | --- |
| Quebracho | 15–45% |
| Lignite | 25–45% |
| Gilsonite | 4–15% |
| Sodium Sulfite | 10–25% |
| Paraformaldehyde | 1–10% |
| Sodium hydroxide | 2–10%. |

4. In a method of drilling gas or oil wells involving the use of a drilling fluid, the improvement which comprises using, as the drilling fluid, the fluid of claim 1.

* * * * *